(12) United States Patent
Yong et al.

(10) Patent No.: US 12,330,616 B2
(45) Date of Patent: Jun. 17, 2025

(54) VEHICLE BRAKING CONTROL SYSTEMS

(71) Applicant: GM GLOBAL TECHNOLOGY OPERATIONS LLC, Detroit, MI (US)

(72) Inventors: Seokju Yong, Bucheon (KR); Bongbum Back, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 230 days.

(21) Appl. No.: 18/116,363

(22) Filed: Mar. 2, 2023

(65) Prior Publication Data

US 2024/0294150 A1  Sep. 5, 2024

(51) Int. Cl.
*B60T 8/171* (2006.01)
*B60L 7/26* (2006.01)

(52) U.S. Cl.
CPC ............. *B60T 8/171* (2013.01); *B60L 7/26* (2013.01); *B60L 2270/14* (2013.01); *B60T 2270/88* (2013.01)

(58) Field of Classification Search
CPC ........ B60L 7/26; B60L 2270/14; B60T 8/171; B60T 2270/88; B60W 20/17; G05D 1/0061; G05D 1/0088; G05D 1/021; G05D 1/0214; G05D 1/0221; G05D 1/0223
See application file for complete search history.

(56) References Cited

U.S. PATENT DOCUMENTS

| 4,743,074 A | * | 5/1988 | Inoue | B60T 8/266 188/106 P |
| 2019/0102959 A1 | * | 4/2019 | Saylor | G07C 5/0825 |

FOREIGN PATENT DOCUMENTS

| FR | 2936762 A1 | * | 4/2010 | ............. B60T 8/173 |
| JP | 2000177552 A | * | 6/2000 | |
| KR | 100356849 B1 | * | 10/2002 | |

OTHER PUBLICATIONS

BEZ, FR 2936762, Apr. 9, 2010, machine translation (Year: 2010).*

* cited by examiner

*Primary Examiner* — Mark L. Greene (57) ABSTRACT

A vehicle braking control system includes a vehicle microphone, two front wheels and two rear wheels of a vehicle, two front brakes and two rear brakes, and an electronic brake pressure control module configured to selectively control an amount of brake pressure applied to the front brakes and the rear brakes. The vehicle control module is configured to detect, via the at least one vehicle microphone, a brake noise value in response to brake pressure applied to the front brakes and the rear brakes, determine whether the brake noise value exceeds a specified brake noise threshold, identify which of the front brakes and the rear brakes are generating a greater noise value in response to the brake noise value exceeding the specified brake noise threshold, and reduce brake pressure applied to the identified one of the front brakes and the rear brakes.

17 Claims, 5 Drawing Sheets

VEHICLE BRAKING CONTROL SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle braking control systems, including vehicle systems that adjust brake pressure based on detected brake noise.

Brake noise generated from pressure applied to vehicle brakes based in response to a driver braking input may be irritating for drivers, and it is desirable to reduce the brake noise for a more enjoyable driving experience. In some cases, hardware adjustments may be made to vehicle brakes, such as tuning brake calipers, brake pads, etc.

SUMMARY

A vehicle braking control system includes at least one vehicle microphone, two front wheels of a vehicle, two front brakes configured to inhibit rotation of the two front wheels in response to brake pressure applied to the front brakes, two rear wheels of the vehicle, two rear brakes configured to inhibit rotation of the two rear wheels in response to brake pressure applied to the rear brakes, an electronic brake pressure control module configured to control an amount of brake pressure applied to the front brakes and an amount of pressure applied to the rear brakes, and a vehicle control module. The vehicle control module is configured to detect, via the at least one vehicle microphone, a brake noise value in response to brake pressure applied to the front brakes and the rear brakes, determine whether the brake noise value exceeds a specified brake noise threshold, identify which of the front brakes and the rear brakes are generating a greater noise value in response to the brake noise value exceeding the specified brake noise threshold, and reduce, via the electronic brake pressure control module, brake pressure applied to the identified one of the front brakes and the rear brakes.

In other features, the vehicle control module is configured to increase brake pressure applied to the rear brakes in response to identifying the front brakes as generating the greater noise value, and increase brake pressure applied to the front brakes in response to identifying the rear brakes as generating the greater noise value.

In other features, the system includes at least one motor configured to drive rotation of at least one of the front wheels and the rear wheels, and the vehicle control module is configured to apply motor braking to the at least one motor, or increase motor braking, in response to the brake noise value exceeding the specified brake noise threshold.

In other features, the system includes at least one regenerative braking module coupled with at least one of the front wheels and the rear wheels, and the vehicle control module is configured to initiate regenerative braking of the regenerative braking module, or increase regenerative braking, in response to the brake noise value exceeding the specified brake noise threshold.

In other features, the vehicle microphone comprises an active noise cancelling (ANC) microphone in an interior of the vehicle.

In other features, the vehicle microphone is a front vehicle microphone positioned closer to the front wheels than the rear wheels, and the vehicle braking control system further comprises a rear vehicle microphone positioned closer to the rear wheels than the front wheels.

In other features, the vehicle control module is configured to determine a magnitude of a front brake noise signal detected via the front vehicle microphone, determine a magnitude of a rear brake noise signal detected via the rear vehicle microphone, identify the front brakes as generating the greater noise value in response to the magnitude of the front brake noise signal being greater than the magnitude of the rear brake noise signal, and identify the rear brakes as generating the greater noise value in response to the magnitude of the front brake noise signal being less than the magnitude of the rear brake noise signal.

In other features, the vehicle control module is configured to determine a minimum brake pressure value associated with generation of the brake noise value exceeding the specified brake noise threshold.

In other features, the vehicle control module is configured to reduce brake pressure applied to the identified one of the front brakes and the rear brakes to below the minimum brake pressure value, in response to the brake noise value exceeding the specified brake noise threshold.

In other features, the specified brake noise threshold includes a brake noise signal having a frequency in a range of 100 hertz to twenty kilohertz.

In other features, the front brakes and the rear brakes each comprise at least one of a disc brake and a drum brake.

A method of controlling vehicle braking includes detecting, via at least one vehicle microphone, a brake noise value in response to brake pressure applied to front brakes of a vehicle and rear brakes of the vehicle, determining whether the brake noise value exceeds a specified brake noise threshold, and identifying which of the front brakes and the rear brakes are generating a greater noise value, in response to the brake noise value exceeding the specified brake noise threshold. The method includes reducing brake pressure applied to the identified one of the front brakes and the rear brakes via an electronic brake pressure control module configured to control an amount of brake pressure applied to the front brakes and an amount of pressure applied to the rear brakes.

In other features, the method includes increasing brake pressure applied to the rear brakes in response to identifying the front brakes as generating the greater noise value, and increasing brake pressure applied to the front brakes in response to identifying the rear brakes as generating the greater noise value.

In other features, the vehicle includes at least one motor configured to drive rotation of at least one of front wheels of the vehicle and rear wheels of the vehicle, and the method further comprises applying motor braking to the at least one motor, or increasing motor braking, in response to the brake noise value exceeding the specified brake noise threshold.

In other features, the vehicle includes at least one regenerative braking module coupled with at least one of front wheels of the vehicle and rear wheels of the vehicle, and the method further comprises initiating regenerative braking of the regenerative braking module, or increasing regenerative braking, in response to the brake noise value exceeding the specified brake noise threshold.

In other features, the vehicle microphone comprises an active noise cancelling (ANC) microphone in an interior of the vehicle.

In other features, the vehicle microphone is a front vehicle microphone positioned closer to front wheels of the vehicle than rear wheels of the vehicle, and the vehicle includes a rear vehicle microphone positioned closer to the rear wheels than the front wheels.

In other features, the method includes determining a magnitude of a front brake noise signal detected via the front vehicle microphone, determining a magnitude of a rear brake noise signal detected via the rear vehicle microphone, identifying the front brakes as generating the greater noise value in response to the magnitude of the front brake noise signal being greater than the magnitude of the rear brake noise signal, and identifying the rear brakes as generating the greater noise value in response to the magnitude of the front brake noise signal being less than the magnitude of the rear brake noise signal.

In other features, the method includes determining a minimum brake pressure value associated with generation of the brake noise value exceeding the specified brake noise threshold.

In other features, the method includes reducing brake pressure applied to the identified one of the front brakes and the rear brakes to below the minimum brake pressure value, in response to the brake noise value exceeding the specified brake noise threshold.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicle brake noise reduction is desirable for driver satisfaction, reduced field warranty issues, improved driving experiences, etc. For example, some drivers may be bothered by noise that is generated from brakes when brake pressure is applied (such as via vibrations between brake pads and discs, etc.). Conventional approaches to reducing brake noise include hardware tuning, such as modifying brake pads and calipers, which may take long periods of time for design changes and validation.

In various implementations described herein, brake pressure may be controlled by an electronic brake pressure control system (such as the General Motors eBoost system), to reduce brake noise when a driver applies brakes during operation of a vehicle.

General customer brake noise may be generated, for example, as cold brake noise in a range of 0.1 g to 0.3 g of braking deceleration, although irritating brake noise may be generated in other ranges of operation of the vehicle. The brake noise may be a low frequency noise, such as in a range of about 100 hertz to about two kilohertz, up to twenty kilohertz, etc.

In some example embodiments, brake noise may be detected by one or more microphones in the vehicle, such as an active noise cancelling (ANC) vehicle microphone. The microphone(s) may be located in, for example, a driver seat, a second row seat, a ceiling of a passenger compartment, etc. In some cases, the brake pressure control system may not require any additional sensors, microphones, electronic control units, etc., other than those already present in a vehicle.

In various implementations, brake noise may be detected and reduced by adjusting brake pressure via, e.g., an electronic brake pressure control module. For example, brake noise may be generated when braking pressure is applied due to various factors, such as brake temperature, humidity, an amount of pressure applied at a brake pad and brake disc, etc.

A vehicle control module may be configured to detect brake noise, such as via a vehicle microphone, and reduce applied brake pressure to reduce the noise. For example, if brake noise is detected as exceeding a specified threshold value (e.g., a decibel level where brake noise is specified as sufficiently irritating to a driver, etc.), the electronic brake pressure control system may reduce the brake pressure until the detected brake noise falls below the specified threshold value.

In some example embodiments, the vehicle control module may be configured to determine whether the brake noise is occurring at a front brake corner of the vehicle (e.g., front brakes associated with front wheels of the vehicle), or whether the brake noise is occurring at a rear brake corner of the vehicle (e.g., rear brakes associated with rear wheels of the vehicle).

The vehicle control module may determine where the brake noise is occurring by, e.g., comparing noise detection signals from multiple microphones located in different parts of the vehicle. For example, if a microphone closer the front of the vehicle is detecting a brake noise signal of greater magnitude than a microphone closer to the rear of the vehicle, the vehicle control module may determine that the brake noise is occurring at the front brakes.

In response to the determination of the direction of the brake noise, the electronic brake pressure control module may be configured to reduce the brake pressure applied to the noise generating brakes, in order to reduce the generated brake noise. For example, if the vehicle control module determines that the front brakes are generating the loudest brake noise, the electronic brake pressure control module may reduce the brake pressure applied to the front brakes. If the vehicle control module determines that the rear brakes are generating the loudest brake noise, the electronic brake pressure control module may reduce the brake pressure applied to the rear brakes.

Although some example embodiments are described herein with reference to vehicles having two front wheels, two front brakes, two rear wheels and two rear brakes, it should be understood that other embodiments may include more or less front wheels and rear wheels, and more or less front brakes and rear brakes.

The brake pressure may be reduced by any suitable amount in response to detection of the brake noise exceeding the specified threshold value. For example, brake pressure may be continually reduced until the brake noise falls below the specified threshold value, brake pressure may be reduced by a specified set amount (to at least reduce the brake noise even if it is not eliminated), brake pressure may be reduced to a stored minimum brake pressure value that was previously determined as a brake pressure value at which brake noise begins to occur (or a brake pressure associated with generation of the specified brake noise threshold value), etc.

The electronic brake pressure control module may be configured to compensate for the reduced brake pressure applied to the brakes generating the brake noise, so the vehicle still experiences similar deceleration in response to the driver's applied braking input (e.g., to avoid the vehicle taking longer to stop than normal). For example, if brake pressure is reduced at the front brakes to reduce brake noise at the front brakes, the electronic brake pressure control module may be configured to increase brake pressure applied to the rear brakes.

Similarly, if brake pressure is reduced at the rear brakes to reduce brake noise at the rear brakes, the electronic brake pressure control module may be configured to increase brake pressure applied to the front brakes The increase in pressure at the brake corner which is not generating the loudest brake noise may be substantially equal to the reduction in brake pressure applied to the brake corner generating the loudest brake noise, or may be greater or less than the reduction in brake pressure at the noise generating brake corner.

In various implementations, other braking mechanisms of the vehicle may be activated, or increased, to compensate for decreased brake pressure applied to the brake corner generating the loudest brake noise. For example, engine braking, motor braking, etc. may be initiated or increased, to compensate for decreased brake pressure applied to the front brakes or the rear brakes.

Some vehicles may include a regenerative braking apparatus configured to captures energy that may otherwise be lost during braking which may be used to help recharge the vehicle's battery. For example, a regenerative braking mechanism may recover some kinetic energy that would otherwise be turned into heat via friction between brake pads and discs. A motor that drives the wheels may act as a generator during deceleration or braking, to resist rotation of the wheels and, e.g., generate electricity to recharge a vehicle battery.

The vehicle control module may be configured to activate regenerative braking at one or move vehicle wheels (such as the wheels generating the brake noise, or wheels of the other brake corner), to counter the reduced brake pressure applied to the noise generating brakes. The example embodiments described herein may be implemented in electric vehicles, internal combustion engine vehicles, etc.

Figure 1:
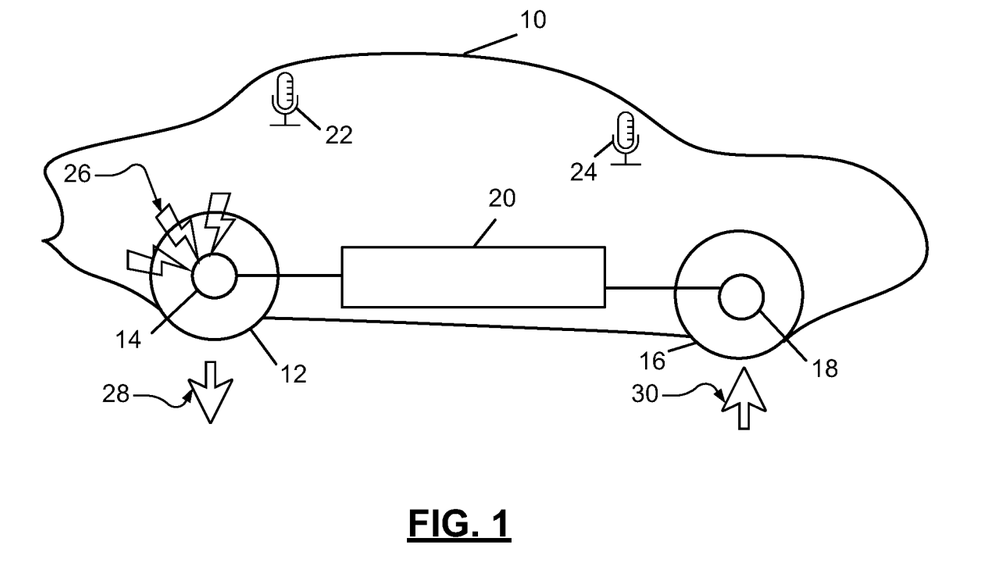
FIG. 1 is a diagram of an example system for controlling vehicle brake pressure based on detected brake noise.

FIG. 1 is a diagram of an example system for controlling vehicle brake pressure based on detected brake noise. As shown in FIG. 1, a vehicle 10 includes rear wheels 12 and front wheels 16. Rear brakes 14 are configured to inhibit rotation of the rear wheels 12, and front brakes 18 are configured to reduce rotation of the front wheels 16.

The vehicle 10 includes an electronic brake pressure module 20 configured to control brake pressure applied to the front brakes 18 and the rear brakes 14. For example, the electronic brake pressure module 20 may individually control an amount of brake pressure applied to the rear brakes 14, and an amount of brake pressure applied to the front brakes 18, such as by controlling an amount of force applied to brake calipers via an actuator, etc. The rear brakes 14 and the front brakes 18 may include any suitable type of vehicle brakes, such as disc brakes or drum brakes.

The vehicle includes a front microphone 24, and a rear microphone 22. The front microphone 24 and the rear microphone 22 may be any suitable microphones capable of detecting brake noise, such as ANC vehicle microphones, directional sensing microphones, etc. The front microphone 24 and the rear microphone 22 may be located within the interior of the vehicle, such as in a driver seat, a rear seat, a ceiling of the passenger compartment, etc.

In various implementations, the front microphone 24 may be located closer to the front brakes 18 than the rear brakes 14, and the rear microphone 22 may be located closer to the rear brakes 14 than the front brakes 18. This arrangement may allow a vehicle control module to determine whether the front brakes or the rear brakes are generating a louder brake noise.

For example, in FIG. 1 the rear brakes 14 are generating a brake noise 26. The rear microphone 22 may detect a louder brake noise than the front microphone 24, because the rear microphone 22 is closer to the source of the brake noise 26 at the rear brakes 14.

Figure 2:
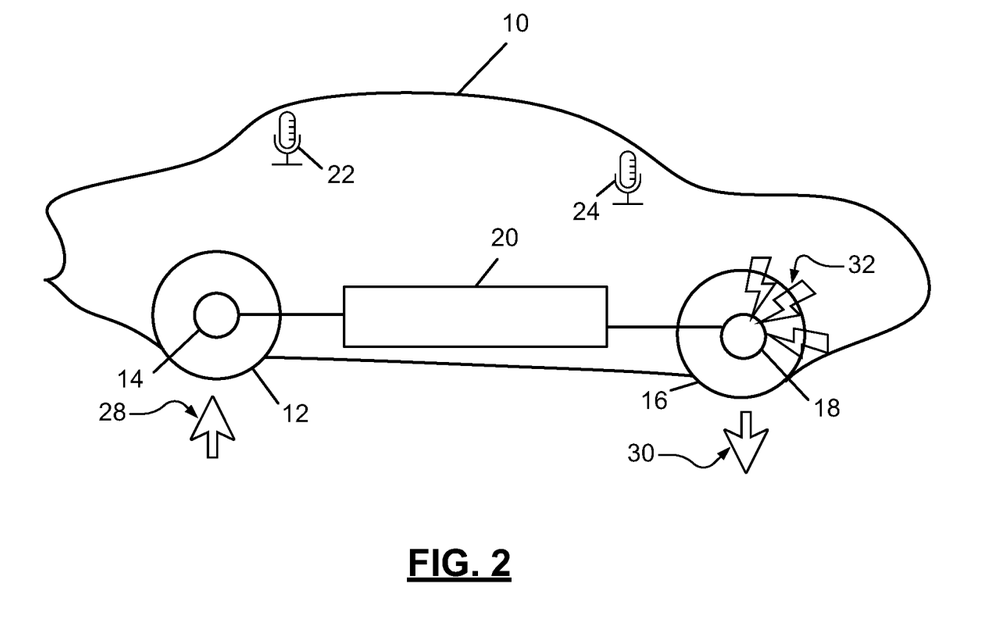
FIG. 2 is a diagram of an example system for controlling vehicle brake pressure based on detected brake noise at a front wheel.

FIG. 2 illustrates another example embodiment where the brake noise 32 is generated at the front brakes 18. The front microphone 24 may detect a louder brake noise signal than the rear microphone 22 in FIG. 2, because the front microphone is closer to the source of the brake noise 32 at the front brakes 18.

The vehicle control module may be configured to determine whether the front brakes 18 or the rear brakes 14 are generating the louder brake noise, based on a comparison of brake noise signal magnitudes from the rear microphone 22 and the front microphone 24. For example, in FIG. 1 the vehicle control module may determine that the rear brakes 14 are generating a louder brake noise 26 based on a magnitude of the brake noise signal being greater at the rear microphone 22 as compared to the front microphone 24.

In response to determining which set of brakes is generating the louder brake noise, the electronic brake pressure module 20 may reduce a brake pressure at the determined set of brakes. For example, in FIG. 1 the electronic brake pressure module 20 may reduce the brake pressure 28 applied to the rear brakes 14, in order to reduce or eliminate the brake noise 26 generated at the rear brakes 14 (e.g., because less brake pressure may lessen the amount of noise generated at the rear brakes 14).

Because reducing the brake pressure 28 at the rear brakes 14 may cause the vehicle 10 to reduce speed at a slower rate (e.g., have less deceleration), the electronic brake pressure module 20 may be configured to compensate by increasing a brake pressure 30 at the front brakes 18. In this manner, brake pressure may be considered as redistributed from the rear brakes 14 to the front brakes 18, in order to reduce the brake noise 26 while maintaining a similar amount of deceleration for the vehicle 10.

In the example of FIG. 2, the electronic brake pressure module 20 may determine that the louder brake noise 32 is occurring at the front brakes 18, and reduce the brake pressure 30 applied to the front brakes 18. In order to compensate for the reduced brake pressure 30 applied to the front brakes 18, the electronic brake pressure module 20 may increase the brake pressure 28 applied to the rear brakes 14.

In either example embodiment, a vehicle control unit may be configured to further compensate for reduced brake pressure at the noise generating brakes by initiating or increasing other mechanisms to reduce a speed of the vehicle. For example, a vehicle control unit may initiate or increase engine braking, may initiate or increase regenerative braking associated with one or more of the rear wheels 12 and the front wheels 16, etc.

In various implementations, a vehicle control module may be configured to detect specified audio characteristics as related to brake noise. For example, brake noise may be specified as sounds that fall within a typical brake noise frequency range, such as 100 Hz-2 kHz (or higher values such as up to 20 kHz, etc.).

In some example embodiments, the vehicle control module may be configured to detect various types of noises in various frequency ranges, and optionally to identify a type of noise based on a detected frequency. For example, a low frequency brake noise in a range of about 5 Hz-60 Hz may be considered as having a roughness character. Other low frequency brake noises in a range of about 50 Hz-500 Hz may be considered as having a groan character or a moan character, while brake noises in a range of about 500 Hz-1 kHz may be considered as having a howl character.

As the brake noise frequency increases, a low frequency squeal-type noise may fall in a range of about 800 Hz-2 kHz. As the brake noise frequency further increases, a high frequency squeal-type noise may be characterized in a range of about 2 kHz up to 20 kHz (or higher). A wire brush brake noise may be characterized in a range of about 9 kHz to about 18 kHz. These example frequency ranges are provided for purposes of illustration only, and different types of brake noise characteristics may have other frequency values.

In some cases, brake noise may be a friction-induced noise which may be caused by coupled modes between pads and rotors, causing out-of-plane vibrations. Brake noise may occur at specific conditions of brake pressure, rotor temperature and environmental conditions, and some brake vibrations may excite in-plane resonances of the brake rotor.

The electronic brake pressure module 20 may be configured to control brake pressure only when the detected brake noise is above a specified threshold value, such as a minimum decibel (dB) level (e.g., at least 75 dB, at least 90 dB, at least 100 dB, etc.). The specified threshold value may be selected to correspond to a brake noise volume that is sufficient to be irritating or worrisome to a driver. The electronic brake pressure module 20 may be configured to ignore detected brake noise sounds that are below the specified threshold value, if they are determined not to rise to a level that may bother the driver.

In some example embodiments, the electronic brake pressure module 20 may be configured to detect and store a currently applied brake line pressure, such as at the moment a brake noise is detected as exceeding the specified threshold value. The electronic brake pressure module 20 may then use the detected brake line pressure as a minimum reference pressure that corresponds to generation of the brake noise above the threshold, in order to avoid exceeding that minimum pressure in the future (or to reduce the brake pressure below the stored minimum when brake noise is detected over the threshold).

The electronic brake pressure module 20 may be configured to require a specified number of brake noise detections before storing a minimum pressure, in order to have a more accurate estimate of the minimum brake pressure at which brake noise exceeds the threshold. For example, the electronic brake pressure module 20 may be configured to require brake noise detection that corresponds to the same minimum pressure at least two times, at least ten times, etc. The electronic brake pressure module 20 may average brake pressure values over a specified number of brake noise detections (e.g., by setting a minimum brake pressure as an average of the last ten times that brake noise was detected over the threshold).

Figure 3:
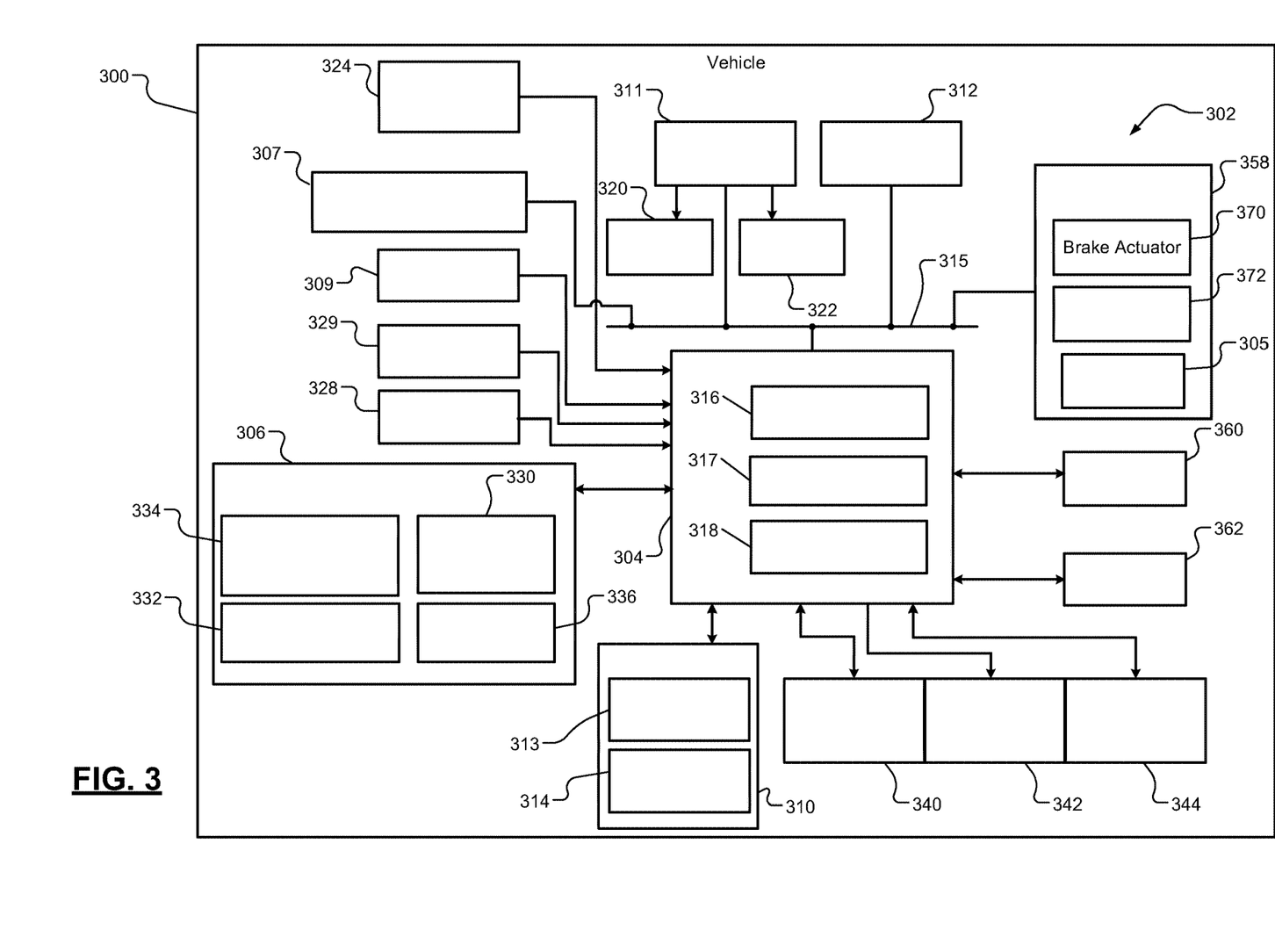
FIG. 3 is a functional block diagram of a vehicle including a brake pressure control system.

FIG. 3 is a functional block diagram of a vehicle including a brake pressure control system. FIG. 3 illustrates a vehicle 300 including a brake control system 302 including an electronic braking control module (EBCM) 305. The EBCM 305 may include a brake pressure control module, or the brake pressure control module may be implemented at the vehicle control module 304, or a combination of both (or one or more other control modules of the vehicle 300). The EBCM 305 provides electronic brake pressure control, including providing boosted brake pressure and/or force, or reduced brake pressure and/or force, according to detected brake noise signals, which may include input from a brake noise detection module 318 of the vehicle control module 304.

The vehicle 300 may be a non-autonomous, partially autonomous or fully autonomous vehicle. The vehicle 300 may be a non-electric, hybrid or fully electric vehicle. The vehicle 300 includes the vehicle control module 304, a memory 306, vehicle microphones 307, and other sensors 309. The vehicle 300 may further include a power source 310, an infotainment module 311 and other control modules 312. The power source 310 includes one or more battery packs (one battery pack 313 is shown) and a control circuit 314.

The vehicle microphones 307 may include any suitable vehicle microphones, such as active noise cancellation (ANC) microphones, microphones in seats or a ceiling of a passenger compartment, directional sensing microphones, etc. The other sensors 309 may include temperature sensors, accelerometers, a vehicle velocity sensor, and/or other sensors. The modules 304, 311, 312 may communicate with each other and have access to the memory 306 via one or more buses and/or network interfaces 315. The network interfaces 315 may include a controller area network (CAN) bus, a local interconnect network (LIN) bus, an auto network communication protocol bus, and/or other network bus.

The vehicle control module 304 controls operation of vehicle systems. The vehicle control module 304 may include a brake pressure control module, a mode selection module 316, a parameter adjustment module 317, a brake noise detection module 318, as well as other modules. The mode selection module 316 may select a vehicle operating mode. The parameter adjustment module 317 may be used to adjust obtain and/or determine parameters of the vehicle 300 based on, for example, signals from the vehicle microphones 307, the other sensors 309 and/or other devices and modules referred to herein. The brake noise detection module 318 may detect brake noise via the vehicle microphones 307 based on, e.g., specified brake noise frequencies. The brake noise detection module 318 may determine whether brake noise is coming from rear brakes or front brakes, based on a comparison of brake noise signals detected by vehicle microphones 307 at different locations in the vehicle.

The vehicle 300 may further include a display 320, an audio system 322, and one or more transceivers 324. The display 320 and/or audio system 322 may be implemented along with the infotainment module 311 as part of an infotainment system. The display 320 and/or audio system 322 may be used to indicate brake alert messages in response to detected brake noise signals exceeding a specified threshold value.

The vehicle 300 may further include a global positioning system (GPS) receiver 328 and a MAP module 329. The GPS receiver 328 may provide vehicle velocity and/or direction (or heading) of the vehicle and/or global clock timing information. The GPS receiver 328 may also provide vehicle location information. The MAP module 329 provides map information. The map information may include traffic control objects, routes being traveled, and/or routes to be traveled between starting locations (or origins) and destinations. The GPS receiver 328 and/or the MAP module 329 may be used to determine location of objects and position of the vehicle 300 relative to the objects. This information may also be used to determine heading information of the vehicle 300, and a relative speed of the vehicle 300.

The memory 306 may store sensor data 330, vehicle parameters 332, a brake pressure control application 334 and other applications 336. The brake pressure control application 334 may be implemented at a brake pressure control module, such as a brake pressure control module of the EBCM 305. The applications 336 may include applications executed by the modules 304, 311, 312.

Although the memory 306 and the vehicle control module 304 are shown as separate devices, the memory 306 and the vehicle control module 304 may be implemented as a single device. The memory 306 may be accessible to the EBCM 305. The EBCM 305 may also include memory storing the brake pressure control application 334 and/or brake information, such as brake pressure or force versus brake actuator distance profiles, minimum brake pressure values corresponding to brake noise generation thresholds, etc. The brake pressure or force versus brake actuator distance profiles, minimum brake pressure threshold values, etc., may be stored in the memory 306.

The vehicle control module 304 may control operation of an engine 340, a converter/generator 342, a transmission 344, a brake control system 358, electric motors 360 and/or a steering system 362 according to parameters set by the modules 304, 311, 312, 318. The vehicle control module 304 may set some of the vehicle parameters 332 based on signals received from the vehicle microphones 307 and/or the other sensors 309.

The vehicle control module 304 may receive power from the power source 310, which may be provided to the engine 340, the converter/generator 342, the transmission 344, the brake control system 358, the electric motors 360 and/or the steering system 362, etc. Some of the vehicle control operations may include enabling fuel and spark of the engine 340, starting and running the electric motors 360, powering any of the systems 302, 358, 362, and/or performing other operations as are further described herein.

The engine 340, the converter/generator 342, the transmission 344, the brake control system 358, the electric motors 360 and/or the steering system 362 may include actuators controlled by the vehicle control module 304 to, for example, adjust fuel, spark, air flow, steering wheel angle, throttle position, pedal position, etc. This control may be based on the outputs of the vehicle microphones 307, the other sensors 309, the GPS receiver 328, the MAP module 329 and the above-stated data and information stored in the memory 306.

The brake control system 358 may be implemented as a brake-by-wire system and/or electronic brake boost system. In an embodiment, the brake control system 358 may include the EBCM 305, a brake actuator 370 and a brake actuator sensor 372. The brake actuator 370 may include a traditional style brake pedal and/or other brake actuator, such as a handheld brake actuator. The brake actuator sensor 372 detects position of the brake actuator 370, which is used to determine displacement of the brake actuator 370. The EBCM 305 may include a motor and an electronic control module for controlling operation of the motor. The motor may adjust brake pressure. The brake pressure may refer to pressure of a hydraulic fluid used to actuate brake pads.

The vehicle control module 304 may determine various parameters including a vehicle speed, an engine speed, an engine torque, a gear state, an accelerometer position, a brake pedal position, an amount of regenerative (charge) power, and/or other information.

Figure 4:
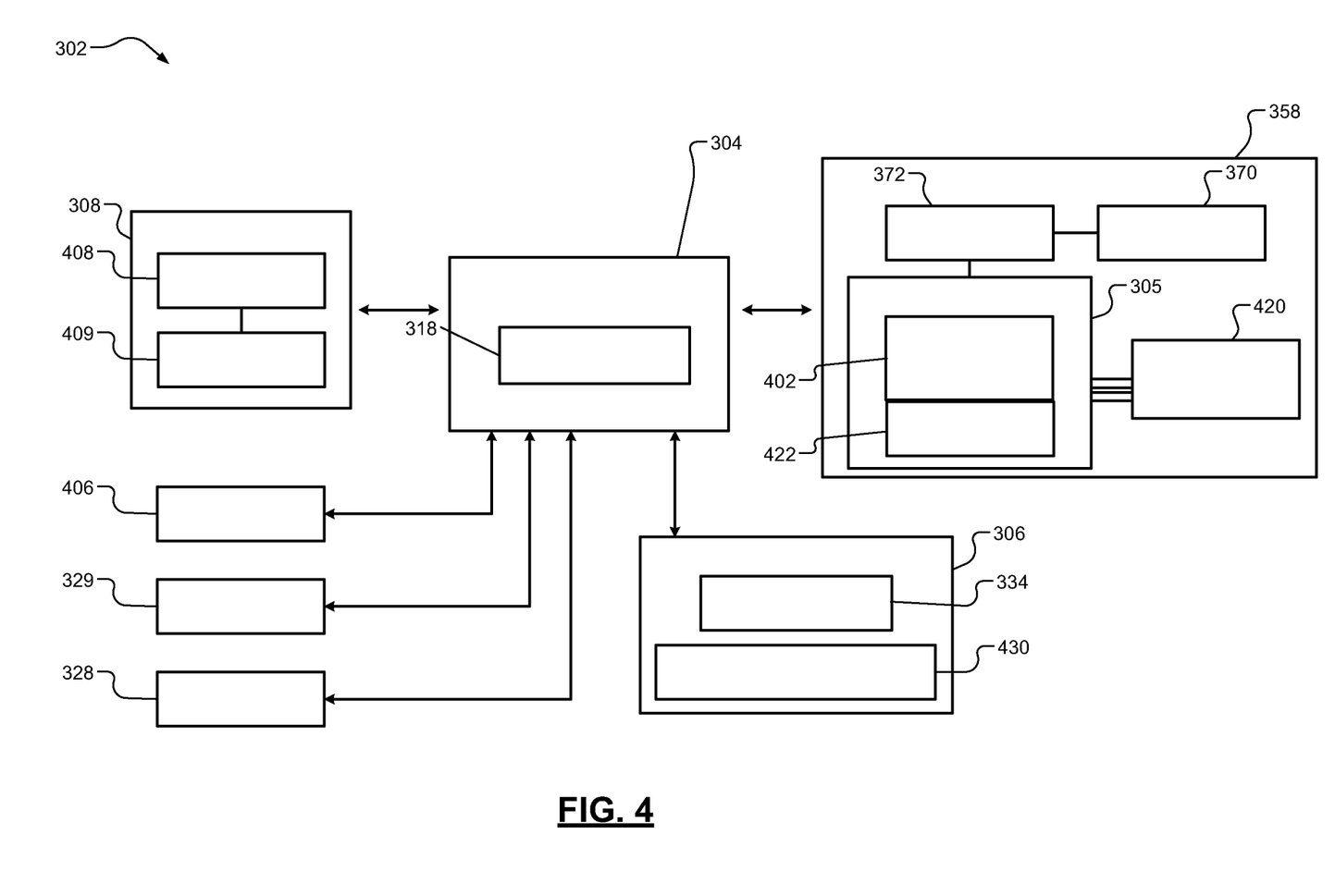
FIG. 4 is a functional block diagram of the brake control system including a brake noise sensing system.

FIG. 4 is a functional block diagram of the brake control system including a brake noise sensing system. FIG. 4 shows the brake control system 302 that includes the vehicle control module 304, the memory 306, the noise sensing system 308, the infotainment module 311, and the brake control system 358. The noise sensing system 308 may include a front microphone 408 and a rear microphone 409.

The speed of the host vehicle may be determined via a vehicle speed sensor 406. The locations, headings and/or speeds of the host vehicle and the objects may be determined via the GPS receiver 328 and the MAP module 329.

The brake pressure control module (e.g., of the EBCM 305 and/or the vehicle control module 304), may select a brake pressure adjustment value, and send the brake pressure adjustment value to the electronic pressure control module 402. For example, the brake pressure control module may determine that brake pressure to at least one brake should be decreased to reduce brake noise.

A current detected brake actuator displacement value indicates a current position of the brake actuator 370. The electronic pressure control module 402 may adjust brake pressure or force based on the brake pressure adjustment value and the current detected brake actuator displacement value. The brake pressure and force may be directly related.

The brake noise detection module 318, the brake pressure control module, the EBCM 305 and/or the electronic pressure control module 402 may perform operations as further described below with respect to FIGS. 5-6 to adjust brake pressure for reducing brake noise, while maintaining sufficient deceleration of the vehicle.

The brake control system 358 includes the EBCM 305, the brake actuator 370, the brake actuator sensor 372, and brake controllers and/or assemblies 420. The EBCM 305 includes the electronic pressure control module 402 and a motor 422. The electronic pressure control module 402 controls the motor 422 to adjust brake pressure. This may be based on a selected one of the brake pressure versus brake noise profiles 430 stored in the memory 306 and/or pressures indicated by the brake pressure control module. One of the brake pressure versus brake noise profiles 430 may be selected by, for example, the brake assist module and/or the electronic pressure control module 402.

Figure 5:
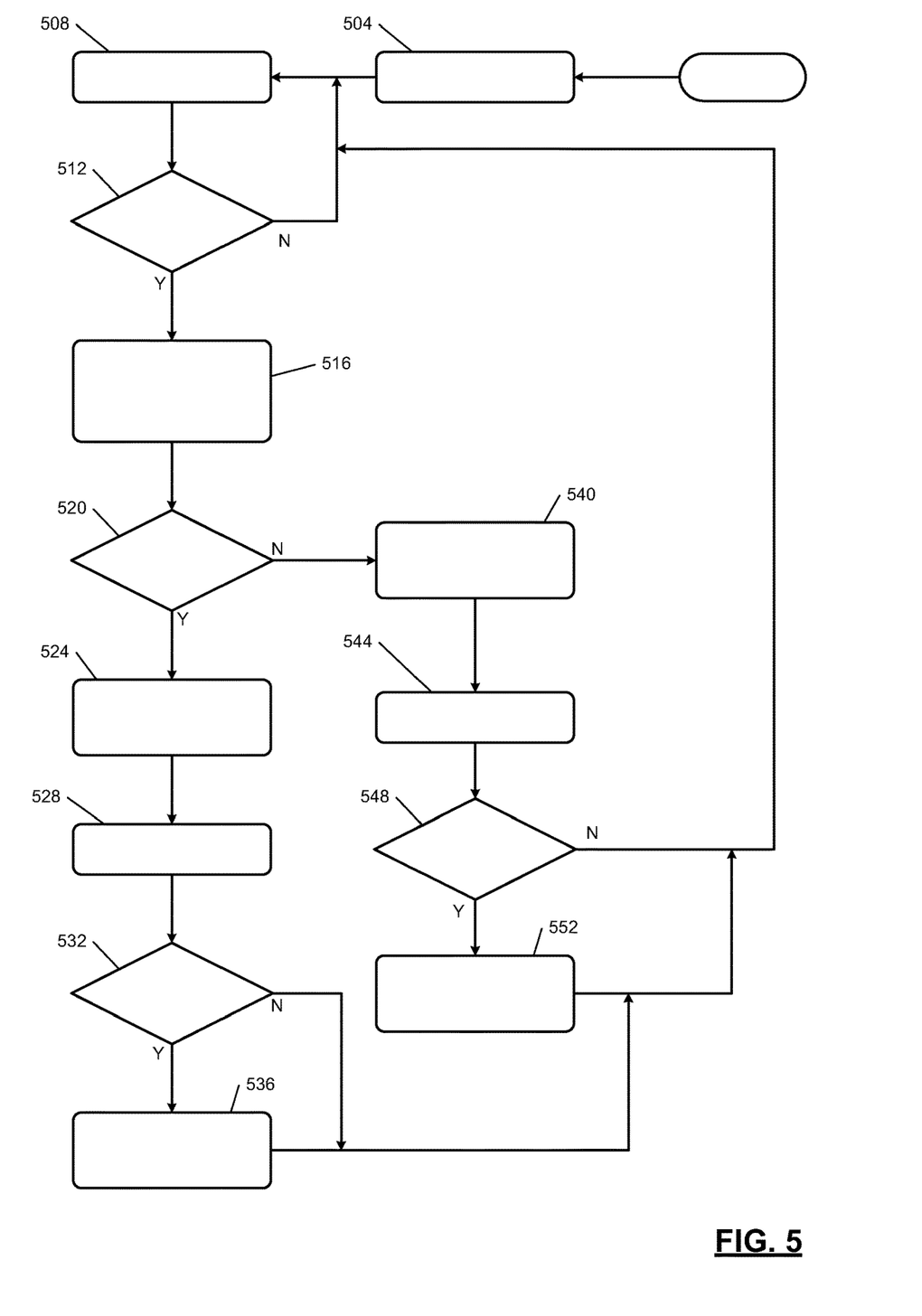
FIG. 5 is a flowchart depicting an example process for determining a brake pressure associated with a brake noise threshold.

FIG. 5 is a flowchart depicting an example process for determining a brake pressure associated with a brake noise threshold. The process may be performed by, e.g., a controller (such as the vehicle control module 304 in FIG. 4) configured to execute computer-executable instructions to implement steps of the process illustrated in FIG. 5.

At 504, the controller is configured to detect a vehicle ignition turn on. The controller then detects vehicle braking at 508. For example, the controller may be configured to wait for a vehicle braking input, such as the driver pressing on the brake pedal, prior to checking for excessive brake noise.

At 512, the controller is configured to determine whether a threshold level of brake noise is detected. For example, the controller may determine whether a minimum decibel level of sound is detected by one or more vehicle microphones, within a specified frequency range associated with brake noise.

If the controller does not detect a threshold level of brake noise, the controller returns to 508 to continue monitoring for brake noise while the braking event is ongoing, or wait until a next braking event is detected. If a threshold level of brake noise is detected at 512, the controller proceeds to 516 to compare front microphone and rear microphone noise signal magnitudes.

For example, the controller may compare magnitudes of sound signals detected by front and rear microphones, in order to determine which brake corner (e.g., rear brakes or front brakes) is likely causing the loudest brake noise, based on which microphone (front or rear) detected the largest noise signal.

If the front noise signal from the front microphone is greater than the rear noise signal from the rear microphone at 520, the controller is configured to store a front brake noise minimum pressure threshold at 524. For example, the controller may determine a minimum level of pressure applied to the front brakes to generate the noise level over the threshold.

The controller then determines a front noise detection count at 528. The front noise detection count may be a number of times that the vehicle control module has detected a front brake noise exceeding the threshold, and a corresponding minimum front brake pressure to cause the front brake noise.

If the front noise detection count is greater than a specified threshold at 532, control proceeds to 536 to set a front brake noise threshold value. For example, the controller may be configured to require at least two instances of front brake noise generation in order to confirm a minimum front brake pressure, at least ten instances, etc. If the controller has not yet reached a specified count of front brake noise detections at 532, the controller is configured to return to 508 to detect a next braking event.

Returning again to 520, if the front noise signal from the front microphone is less than the rear noise signal from the rear microphone, the controller is configured to store a rear brake noise minimum pressure threshold at 540. For example, the controller may determine a minimum level of pressure applied to the rear brakes to generate the brake noise level over the threshold.

The controller then determines a rear noise detection count at 544. The rear noise detection count may be a number of times that the vehicle control module has detected a rear brake noise exceeding the threshold, and a corresponding minimum rear brake pressure to cause the rear brake noise.

If the rear noise detection count is greater than a specified threshold at 548, control proceeds to 536 to set a rear brake noise threshold value. For example, the controller may be configured to require at least two instances of rear brake noise generation in order to confirm a minimum front brake pressure, at least ten instances, etc. If the controller has not yet reached a specified count of rear brake noise detections at 548, the controller is configured to return to 508 to detect a next braking event.

Figure 6:
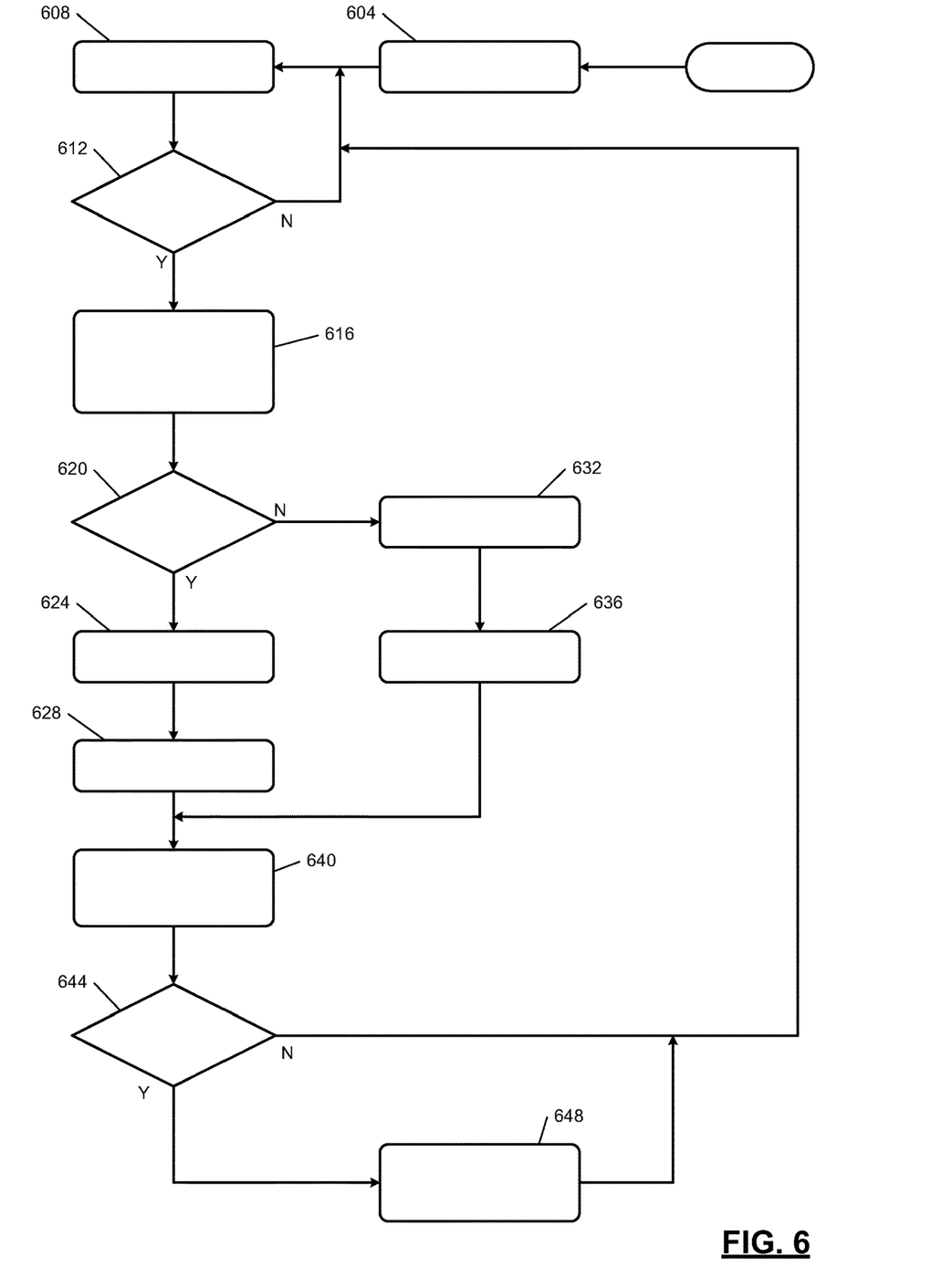
FIG. 6 is a flowchart depicting an example process for controlling brake pressure based on detected brake noise.

FIG. 6 is a flowchart depicting an example process for controlling brake pressure based on detected brake noise. The process may be performed by, e.g., a controller (such as the vehicle control module 304 in FIG. 4) configured to execute computer-executable instructions to implement steps of the process illustrated in FIG. 6.

At 604, the controller is configured to detect a vehicle ignition turn on. The controller then detects vehicle braking at 608. For example, the controller may be configured to wait for a vehicle braking input, such as the driver pressing on the brake pedal, prior to checking for excessive brake noise.

At 612, the controller is configured to determine whether a threshold level of brake noise is detected. For example, the controller may determine whether a minimum decibel level of sound is detected by one or more vehicle microphones, within a specified frequency range associated with brake noise.

If the controller does not detect a threshold level of brake noise, the controller returns to 608 to continue monitoring for brake noise while the braking event is ongoing, or wait until a next braking event is detected. If a threshold level of brake noise is detected at 612, the controller proceeds to 616 to compare front microphone and rear microphone noise signal magnitudes.

If the front noise signal from the front microphone is greater than the rear noise signal from the rear microphone at 620, the controller is configured to increase pressure at rear brakes of the vehicle. For example, an electronic brake control module may be configured to increase an amount of brake pressure applied to the rear brakes at 624, to compensate for a reduction in brake pressure at the front brakes to reduce the brake noise generated by the front brakes.

At 628, the controller is configured to reduce pressure at the front brakes. For example, the controller may reduce the brake pressure applied to the front brakes to below a previously determined minimum bake pressure associated with generation of a threshold level of brake noise at the front brakes.

If the controller determines at 620 that the front noise signal from the front microphone is less than the rear noise signal from the rear microphone, the controller is configured to increase pressure at front brakes of the vehicle at 632. For example, the electronic brake control module may be configured to increase an amount of brake pressure applied to the front brakes, to compensate for a reduction in brake pressure at the rear brakes to reduce the brake noise generated by the rear brakes.

At 636, the controller is configured to reduce pressure at the rear brakes. For example, the controller may reduce the brake pressure applied to the rear brakes to below a previously determined minimum brake pressure associated with generation of a threshold level of brake noise at the rear brakes.

The controller is configured to determine whether brake and/or engine regeneration setting have been specified, at 640. For example, some vehicles may be equipped with mechanisms for implementing engine braking and/or regenerative braking associated with one or more wheels of the vehicle.

If use of energy regeneration settings is specified at 644, the controller is configured to activate or increase engine braking, or activate or increase regenerative braking, to further compensate for the reduction in brake pressure to reduce excessive brake noise. The controller is then configured to return to 608 to detect a next braking event.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle braking control system comprising:
    two front wheels of a vehicle;
    two front brakes configured to inhibit rotation of the two front wheels in response to brake pressure applied to the front brakes;
    two rear wheels of the vehicle;
    two rear brakes configured to inhibit rotation of the two rear wheels in response to brake pressure applied to the rear brakes;
    a front vehicle microphone positioned closer to the front wheels than the rear wheels;
    a rear vehicle microphone positioned closer to the rear wheels than the front wheels;
    an electronic brake pressure control module configured to control an amount of brake pressure applied to the front brakes and an amount of brake pressure applied to the rear brakes; and
    a vehicle control module configured to:
        detect, via the front vehicle microphone and the rear vehicle microphone, a brake noise value in response to brake pressure applied to the front brakes and the rear brakes;
        determine whether the brake noise value exceeds a specified brake noise threshold;
        in response to the brake noise value exceeding the specified brake noise threshold, identify which of the front brakes and the rear brakes are generating a greater noise value by,
            determining a magnitude of a front brake noise signal detected via the front vehicle microphone,
            determining a magnitude of a rear brake noise signal detected via the rear vehicle microphone,
            identifying the front brakes as generating the greater noise value in response to the magnitude of the front brake noise signal being greater than the magnitude of the rear brake noise signal, and
            identifying the rear brakes as generating the greater noise value in response to the magnitude of the front brake noise signal being less than the magnitude of the rear brake noise signal; and
        reduce, via the electronic brake pressure control module, brake pressure applied to the identified one of the front brakes and the rear brakes.

2. The vehicle braking control system of claim 1, wherein the vehicle control module is configured to:
    increase brake pressure applied to the rear brakes in response to identifying the front brakes as generating the greater noise value; and
    increase brake pressure applied to the front brakes in response to identifying the rear brakes as generating the greater noise value.

3. The vehicle braking control system of claim 1, further comprising at least one motor configured to drive rotation of at least one of the front wheels and the rear wheels,
    wherein the vehicle control module is configured to apply motor braking to the at least one motor, or increase motor braking, in response to the brake noise value exceeding the specified brake noise threshold.

4. The vehicle braking control system of claim 1, further comprising at least one regenerative braking module coupled with at least one of the front wheels and the rear wheels,
wherein the vehicle control module is configured to initiate regenerative braking of the regenerative braking module, or increase regenerative braking, in response to the brake noise value exceeding the specified brake noise threshold.

5. The vehicle braking control system of claim 1, wherein the front vehicle microphone comprises an active noise cancelling (ANC) microphone in an interior of the vehicle.

6. The vehicle braking control system of claim 1, wherein the specified brake noise threshold includes a brake noise signal having a frequency in a range of 100 hertz to twenty kilohertz.

7. The vehicle braking control system of claim 1, wherein the front brakes and the rear brakes each comprise at least one of a disc brake and a drum brake.

8. A vehicle braking control system comprising:
at least one vehicle microphone;
two front wheels of a vehicle;
two front brakes configured to inhibit rotation of the two front wheels in response to brake pressure applied to the front brakes;
two rear wheels of the vehicle;
two rear brakes configured to inhibit rotation of the two rear wheels in response to brake pressure applied to the rear brakes;
an electronic brake pressure control module configured to control an amount of brake pressure applied to the front brakes and an amount of pressure applied to the rear brakes; and
a vehicle control module configured to:
detect, via the at least one vehicle microphone, a brake noise value in response to brake pressure applied to the front brakes and the rear brakes;
determine whether the brake noise value exceeds a specified brake noise threshold;
in response to the brake noise value exceeding the specified brake noise threshold, identify which of the front brakes and the rear brakes are generating a greater noise value;
reduce, via the electronic brake pressure control module, brake pressure applied to the identified one of the front brakes and the rear brakes; and
determine a minimum brake pressure value associated with generation of the brake noise value exceeding the specified brake noise threshold.

9. The vehicle braking control system of claim 8, wherein the vehicle control module is configured to reduce brake pressure applied to the identified one of the front brakes and the rear brakes to below the minimum brake pressure value, in response to the brake noise value exceeding the specified brake noise threshold.

10. A method of controlling vehicle braking, the method comprising:
detecting, via at least one vehicle microphone, a brake noise value in response to brake pressure applied to front brakes of a vehicle and rear brakes of the vehicle;
determining whether the brake noise value exceeds a specified brake noise threshold;
in response to the brake noise value exceeding the specified brake noise threshold, identifying which of the front brakes and the rear brakes are generating a greater noise value;
reducing brake pressure applied to the identified one of the front brakes and the rear brakes via an electronic brake pressure control module configured to control an amount of brake pressure applied to the front brakes and an amount of brake pressure applied to the rear brakes; and
determining a minimum brake pressure value associated with generation of the brake noise value exceeding the specified brake noise threshold.

11. The method of claim 10, further comprising:
increasing brake pressure applied to the rear brakes in response to identifying the front brakes as generating the greater noise value; and
increasing brake pressure applied to the front brakes in response to identifying the rear brakes as generating the greater noise value.

12. The method of claim 10, wherein:
the vehicle includes at least one motor configured to drive rotation of at least one of front wheels of the vehicle and rear wheels of the vehicle; and
the method further comprises applying motor braking to the at least one motor, or increasing motor braking, in response to the brake noise value exceeding the specified brake noise threshold.

13. The method of claim 10, wherein:
the vehicle includes at least one regenerative braking module coupled with at least one of front wheels of the vehicle and rear wheels of the vehicle; and
the method further comprises initiating regenerative braking of the regenerative braking module, or increasing regenerative braking, in response to the brake noise value exceeding the specified brake noise threshold.

14. The method of claim 10, wherein the vehicle microphone comprises an active noise cancelling (ANC) microphone in an interior of the vehicle.

15. The method of claim 10, wherein:
the vehicle microphone is a front vehicle microphone positioned closer to front wheels of the vehicle than rear wheels of the vehicle; and
the vehicle includes a rear vehicle microphone positioned closer to the rear wheels than the front wheels.

16. The method of claim 15, further comprising:
determining a magnitude of a front brake noise signal detected via the front vehicle microphone;
determining a magnitude of a rear brake noise signal detected via the rear vehicle microphone;
identifying the front brakes as generating the greater noise value in response to the magnitude of the front brake noise signal being greater than the magnitude of the rear brake noise signal; and
identifying the rear brakes as generating the greater noise value in response to the magnitude of the front brake noise signal being less than the magnitude of the rear brake noise signal.

17. The method of claim 10, further comprising reducing brake pressure applied to the identified one of the front brakes and the rear brakes to below the minimum brake pressure value, in response to the brake noise value exceeding the specified brake noise threshold.

* * * * *